(No Model.)
J. L. GARBER.
ELECTRIC TYPE WRITING MACHINE.
No. 554,594. Patented Feb. 11, 1896.
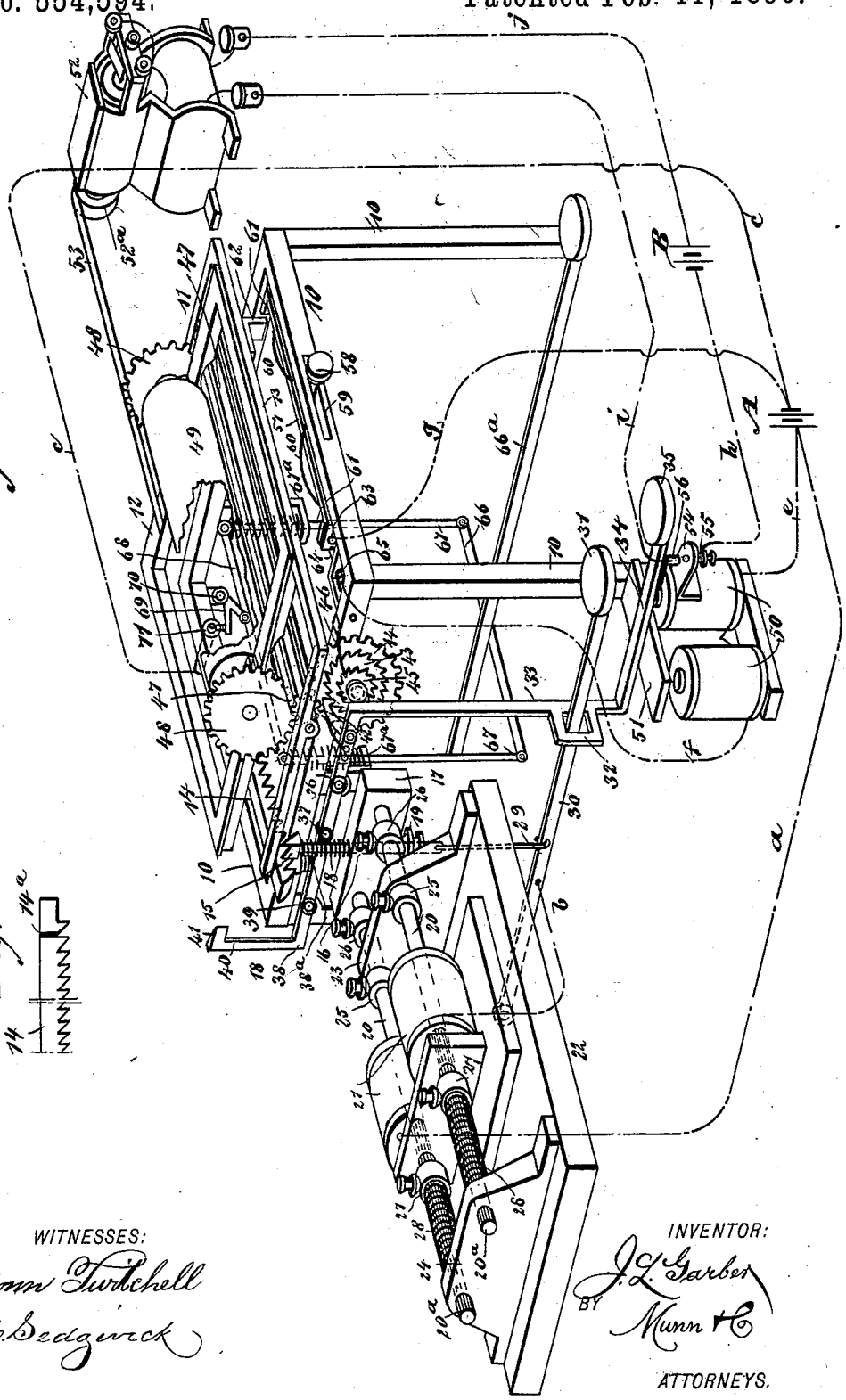
WITNESSES:
Donn Twitchell
C. Sedgwick
INVENTOR:
J. L. Garber
BY Munn & Co.
ATTORNEYS.

UNITED STATES PATENT OFFICE.

JOHN LEBBEUS GARBER, OF SIDNEY, OHIO.

ELECTRIC TYPE-WRITING MACHINE.

SPECIFICATION forming part of Letters Patent No. 554,594, dated February 11, 1896.

Application filed February 26, 1892. Serial No. 422,908. (No model.)

*To all whom it may concern:*

Be it known that I, JOHN LEBBEUS GARBER, of Sidney, in the county of Shelby and State of Ohio, have invented a new and Improved Electrically-Operated Type-Writer, of which the following is a full, clear, and exact description.

My invention relates to improvements in type-writers; and the object of my invention is to facilitate the movement of the type-writer carriage, which I do by providing electrically-operated means for moving it, and also to provide similar means for moving the platen or roller of the machine.

To this end my invention consists in certain features of construction and combinations of parts, which will be hereinafter described and claimed.

Reference is to be had to the accompanying drawings, in which similar figures and letters of reference indicate corresponding parts in both the views.

Figure 1 is a broken diagrammatic view showing the electrical connections and showing in perspective the parts of the attachments embodying my invention, and Fig. 2 is a broken detail view of the notched bar which is secured to the type-writer carriage.

In the drawings no attempt is made to show in detail the type-writer, or even the type-writer carriage, as my invention may be used in connection with all kinds of type-writers having a sliding carriage, and enough is shown merely to illustrate the use of my electrical attachments in moving said carriage and moving the roller or platen thereon.

The type-writer frame 10 may be of any of the approved kinds, and on this is a sliding carriage 11 comprising the upper and lower frames 12 and 13. On the under side of the carriage and secured to the frame 13 is a notched bar 14, which extends the entire length of the carriage and the teeth of which are produced on the under side, the teeth having one inclined side and the other vertical, and the tooth at the right-hand end of the bar is insulated from the remainder of the bar, as shown at 14$^a$ in Fig. 2, so as to break the circuit through the bar when the carriage has reached the limit of its movement to the left, as hereinafter described.

The notched bar 14 is engaged by an inclined tooth 15, which tooth is formed on a vertical arm 16, and the latter is held to move vertically in a cross-piece 17, which is arranged parallel with the side of the type-writer, and the tooth is normally pressed upward into engagement with the notched bar by a spiral spring 18, which is coiled around the arm 16 between the tooth and the cross-piece 17. The upward movement of the arm 16 and tooth 15 is limited by the nuts 19 on the lower end of the arm.

The cross-piece 17 connects the two plunger-armatures 20, which are held to slide horizontally in the solenoid-magnets 21, these being mounted upon supports 22 at one end of the type-writer, and the armatures 20 have their rear ends 20$^a$—that is, their outer ends— preferably formed of non-magnetic metal, or of hard rubber or similar material, and when formed of rubber or the like they are provided with a metallic bushing, so that they may slide easily and without excessive wear in their bearings. The plunger-armatures 20 are held to slide in bearings 23 and 24, secured to the upper side of the support 22, and the movement of the plunger-armatures is limited by the collars 25 and 26, which are secured by set-screws to the armatures on opposite sides of the bearing 23, and the collars are usually adjusted so that the stroke of the armatures will correspond very nearly to the distance between the teeth on the notched bar 14. On the outer portions of the armatures 20 are collars 27, which are also secured by set-screws, and between these collars and the bearing 24 are spiral springs 28, which are wound around the armatures, and it will be seen that the tension of these springs may be regulated by adjusting the collars 27. The solenoids 21 serve to move the plunger-armatures 20 in one direction, and the return stroke is effected by these springs 28. It will be seen, then, that the plunger-armatures and their connections effect the horizontal movement of the arm 16, the tooth 15, and the notched bar 14, and the vertical movement of the arm 16 is effected by means of the connecting-link 29 and the lever 30. The link 29 is pivotally connected with the lever 30, and the latter extends forward at one end of the machine, being pivoted at its rear end in a suitable support, the front end of the lever terminating in a finger-piece 31, so that, if necessary or desirable, it may be depressed by hand.

The lever 30 extends horizontally through an eye or keeper 32, formed on the vertical portion of a lever 33, so that the levers 30 and 33 may be moved in unison, and the lever 33 has a horizontally and forwardly extending portion 34, terminating in a finger-piece 35, and the upper portion of the lever is arranged parallel with the upper end portion of the machine-frame and is pivoted to the frame, as shown at 36. The rear end of the lever 33 is pivotally connected, as shown at 37, the joint being insulated, with an L-shaped lever 38, which is pressed by a spring 38$^a$, so as to throw its inner end downward and its upper end inward, the lever being pivoted to the machine-frame, as shown at 39, and has an upwardly-extending arm 40, on the upper end of which is a forwardly-extending tooth 41, adapted to engage the usual notched bar on the rear of the carriage and prevent the backward movement of the carriage.

It will be seen that when the lever 33 is depressed the joint 37 will move upward, so as to swing the lever 38 and move back the tooth 41, thus freeing the carriage. The lever 33 serves to revolve the platen of the machine, and to this end the lever is provided with a spring-pressed pawl 42, which is pivoted to the lever and extends forward and upward, the pawl engaging a ratchet-wheel 43, formed on one side of a cog-wheel 44, which also is pivoted to the machine-frame 10 near the top, and a smaller ratchet-wheel 45 is also formed on the cog-wheel, or, rather, on the ratchet-wheel 43, and the teeth of the ratchet-wheel 45 are engaged by a pawl 46 on the machine-frame, this pawl preventing the backward movement of the ratchet-wheel and cog-wheel. The pawl 42 may be made to connect with either the ratchet-wheel 43 or 45, according as the platen is to be revolved a greater or a less distance, and this provides for the line-spacing when the machine is used. The cog-wheel 44 engages a cog-roller 47, which is pivoted in the carriage 11 and extends longitudinally thereof, and this cog-roller meshes with cog-wheels 48 on each end of the roller or platen 49. The cog-wheels 44 and 48 are preferably provided with rawhide teeth, so that they will work noiselessly, or nearly so.

The levers 30 and 33 may be hand-operated, so as to regulate the movement of the carriage and of the roller, or electrical means may be employed. To provide for the latter, the horizontal portion 34 of the lever 33 has beneath it a pair of magnets 50, and secured to the lever above the magnets is an armature 51, and when the magnets are energized the armature is depressed, thus operating both levers 30 and 33. The circuits of the magnets, as well as of the solenoids and other parts of the machine, will be followed out below.

The movement of the carriage to the right—that is, the return movement after a line has been printed—may be effected by the usual weighted wheel or a spring-barrel, or a motor 52 may be used, and in this case the motor is supported at one side of the machine and has its pulley 52$^a$ connected by means of a belt 53 with the carriage 11, so that when the motor is operated the belt will be wound upon the pulley 52$^a$ and the carriage moved. The motor may be of any approved kind.

A circuit-closer is provided for closing the circuit through the motor by the depression of the lever 33, and to this end a lug 54 projects from one of the magnets 50 and beneath the horizontal end 34 of the lever 33, and in this lug is a vertical contact 55, which is adapted to engage a similar contact, 56, above it and on the under side of the part 34 of the lever 33, these points of contact being connected with the motor and with a source of electricity, as described below.

The circuit through the magnets 50 is closed either by hand or by the movement of the carriage, and to this end, on the front side of the frame 10 and on the upper part, is a slide-bar 57, which has on its front side a stud or handle 58, which projects through a longitudinal slot 59 in the front part of the frame 10, and this stud provides for moving the slide-bar by hand. The slide-bar is supported and held in place by the elliptical springs 60, which are secured to the frame 10, and the slide-bar has inwardly-projecting lugs 61 at the ends, which are adapted to engage a lug 62 on the under side of the carriage 11. One of the lugs—that is, the lug at the left-hand end of the slide-bar—has a contact 63, which connects with a source of electricity, and which is adapted to engage a spring-pressed insulated contact 64, the latter being pressed by a spring 65 and held in a suitable support at one end of the machine-frame 10.

Near the back portion of the machine is a vertical frame substantially of the usual kind, comprising a lower cross-piece 66, on which the type-writer keys 66$^a$ rest, and the vertical side pieces 67, which are normally pressed upward by springs, as shown in the drawings, these springs being arranged between the upper ends of the side pieces and supporting-lugs 67$^a$ on the machine-frame, and the upper ends of the side pieces are connected by a cross-piece 68. This cross-piece 68 is pivotally connected to the lower arm of a V-shaped circuit-breaker 69, which is pivoted on the machine-frame, as shown at 70, and the upper arm of this circuit-breaker is adapted to connect with a contact point or pin 71, which extends transversely through the back bar of the machine-frame 10, and which is suitably insulated therein. This pin connects with a source of electricity, and the contact-breaking lever 69 is normally held in engagement with the contact-pin by a suitable spring.

As shown in the drawings, the machine is provided with two batteries A and B, as the sources of electricity, but it will be understood that the various magnets and the batteries may be connected with any suitable source, The circuits are as follows: from the battery A, through the wire $a$, the solenoid-magnets 21, the wire $b$, the lever 30, the link 29, the arm 16, the tooth 15, the notched bar 14 and the other parts of the machine, the circuit-breaker 69, contact-pins 71, and the wire $c$ back to the battery. The circuit through the magnets 50 is as follows: from the battery A, through the wire $e$, the magnets 50, the wire $f$, the contact-point 64, the contact-point 63 of the slide-bar 57, and the wire $g$ to the battery. The motor-circuit is from the battery B through the wire $h$, the contact 55, the contact 56, the wire $i$, the motor, and the wire $j$ to the battery.

The operation of the machine is as follows: It will be understood that all the type-keys 66ª extend above the cross-piece 66, and when one of these is depressed to print a letter the cross-piece 66, side pieces 67, and cross-piece 68 are pulled down, thus pulling down the circuit-breaker 69 and breaking the circuit through the solenoids, and when the circuit is broken the springs 28 push forward the cross-piece 17 and the tooth 15 of the arm 16. At the return of the type-key—that is, after the letter is printed—the reverse movement will close the circuit—that is, the upper arm of the circuit-breaker 69 will come in contact with the pin 71, and the solenoids will then pull on the armatures 20 and cross-piece 17, thus advancing the notched bar 14 and the carriage 11 the distance of one tooth, and this will be the distance of one letter-space. It will be understood that this operation will be repeated as often as a type-key is struck. The movement of the carriage to the left will unwind the belt 53, and when the carriage is to be moved to the right the slide-bar 57 may be pushed to the left so as to make the contacts 63 and 64 touch, thus closing the circuit through the magnets 50, and the magnets will pull down the armature 51 and the lever 33, thus closing the motor-circuit through the circuit-closer arranged on the magnets and on the under side of the lever 33, and the motor will wind up the belt 53 so as to advance the carriage to the right. It will be seen that this may be also done by pressing down directly upon the key 35, so as to close the motor-circuit.

It will be noticed that when the motor-circuit is closed at the end of a line the downward movement of the lever 33 will also move down the lever 30, thus releasing the tooth 15 from the bar 14, so as to permit the free return of the carriage, and the pawl 42 acting on the ratchet-wheel 43, the cog-wheel 44, the cog-roller 47, and the cog-wheels 48 will advance the platen 49, so as to carry the paper forward the necessary space for a line, and the whole movement will be done practically in an automatic manner. When the carriage has advanced to the left the distance of one line, the lug 62 engages one of the lugs 61 of the slide-bar 57, thus pushing the slide-bar and automatically closing the circuit through the magnets 50 and the motor, and the motor will start up so as to wind up the belt 53 and return the carriage.

It will be understood that the motor may be dispensed with and the ordinary weighted wheel or spring-barrel used in its place, or the motor may be used and a weighted wheel or spring-barrel used instead of the solenoids to move the carriage to the left. When the carriage has reached the limit of its movement to the left, the circuit will be automatically broken through the solenoids by the tooth 15 coming in contact with the notch at the right-hand end of the notched bar 14, and the free return movement of the carriage will be thus assured.

Having thus described my invention, I claim as new and desire to secure by Letters Patent—

1. The combination with a type-writer, the carriage thereon and the notched bar secured to the carriage, of solenoid-magnets arranged adjacent to the type-writer, spring-pressed plunger-armatures for the magnets, a cross-piece connecting the plunger-armatures, a spring-pressed arm held to slide vertically in the cross-piece and having a tooth to engage the notched bar of the carriage, a magnet-operated lever to effect the vertical movement of the toothed arm, and a circuit-closer arranged in the circuits of the lever-magnets and the solenoid-magnets, substantially as described.

2. The combination, with the carriage and the platen thereon, of a cog-roller journaled in the carriage and geared to the platen, ratchet-wheels pivoted on the type-writer frame and having a gear connection with the cog-roller, and a lever pivoted on the machine-frame and having a pawl adapted to connect with the ratchet-wheels, substantially as described.

3. The combination, with the machine, the carriage thereon, the platen, and the cog-roller journaled in the carriage and geared to the platen, of ratchet-wheels pivoted on the machine-frame and geared to the cog-roller, a vertically-swinging lever pivoted on the machine-frame and connected by a pawl with the ratchet-wheels, electromagnets for effecting the movement of the lever, and means for closing the magnet-circuits by the movement of the carriage, substantially as described.

4. The combination with the machine, the carriage thereon, and the carriage-platen having cog-wheels at its ends, of the cog-roller journaled in the carriage and geared to the platen-cogs, the ratchet-wheels pivoted on the machine-frame and geared to the cog-roller, a lever pivoted on the end of the machine and having a pawl connected with the ratchet-wheels, magnets for swinging the lever vertically, a vertically-movable toothed arm adapted to engage a notched bar on the carriage, a lever pivoted to the arm so as to move it vertically, said lever being also connected with the magnet-operated lever, and means for closing the circuit through the magnets by the movement of the carriage, substantially as described.

5. The combination, with the type-writer, the movable carriage thereon, the lever and ratchet mechanism for making the line-spaces of the carriage-platen, the magnets for operating the lever, and the motor for effecting the return of the carriage, of a contact supported on the machine-frame and forming one terminal of the magnet-circuit, a slide-bar arranged opposite the contact and forming the other terminal of the magnet-circuit, means for moving the slide-bar by the movements of the carriage, and a circuit-closer arranged in the motor-circuit and closed by the energizing of the magnets, substantially as described.

6. The combination, with the vertically-swinging lever having a ratchet mechanism to revolve the carriage-platen, of an L-shaped, spring-pressed lever pivotally connected with the first lever and also pivoted to the machine-frame, the said lever having a tooth at its upper end to engage a ratchet-bar of the carriage, substantially as described.

JOHN LEBBEUS GARBER.

Witnesses:
 HENRY ALFELE,
 MINNESOTA GARBER.